Patented Feb. 7, 1928.

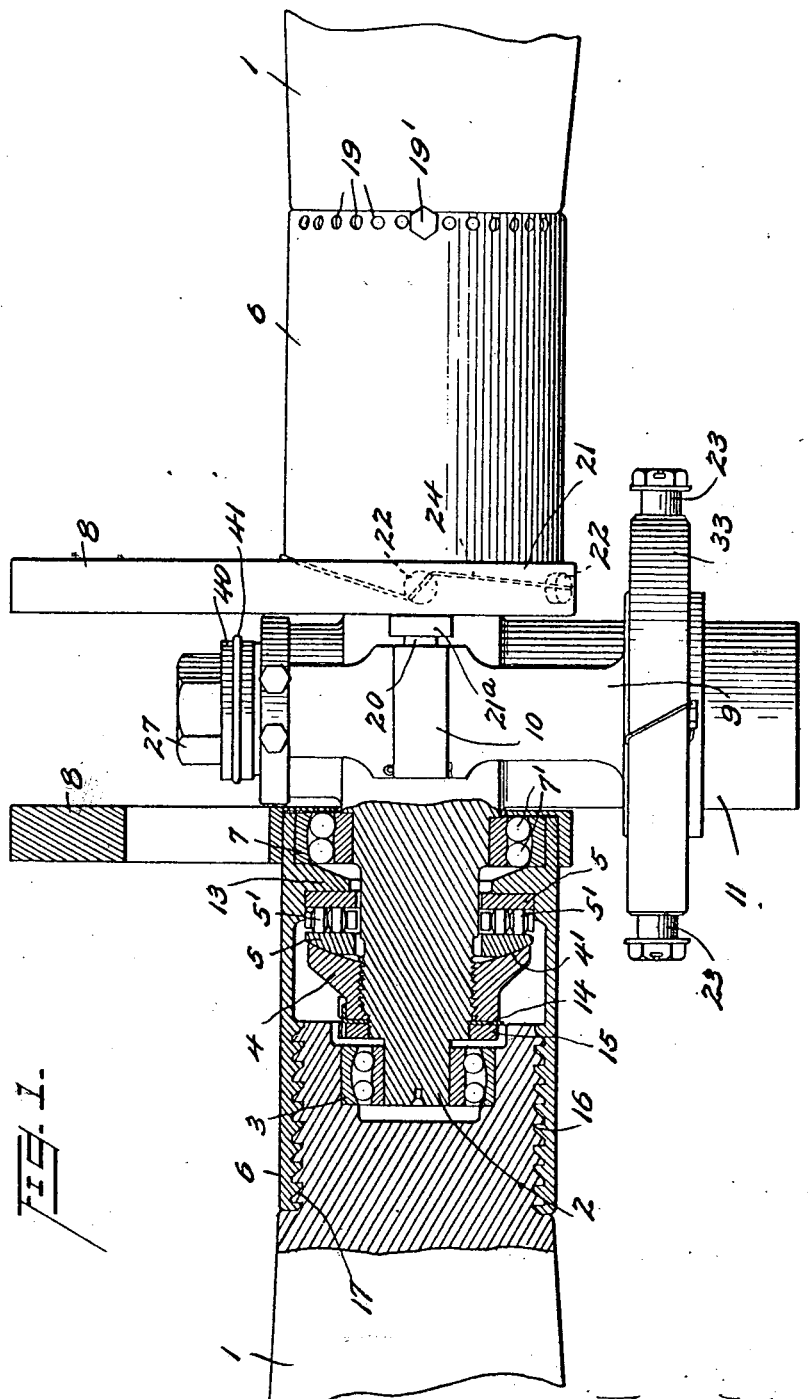

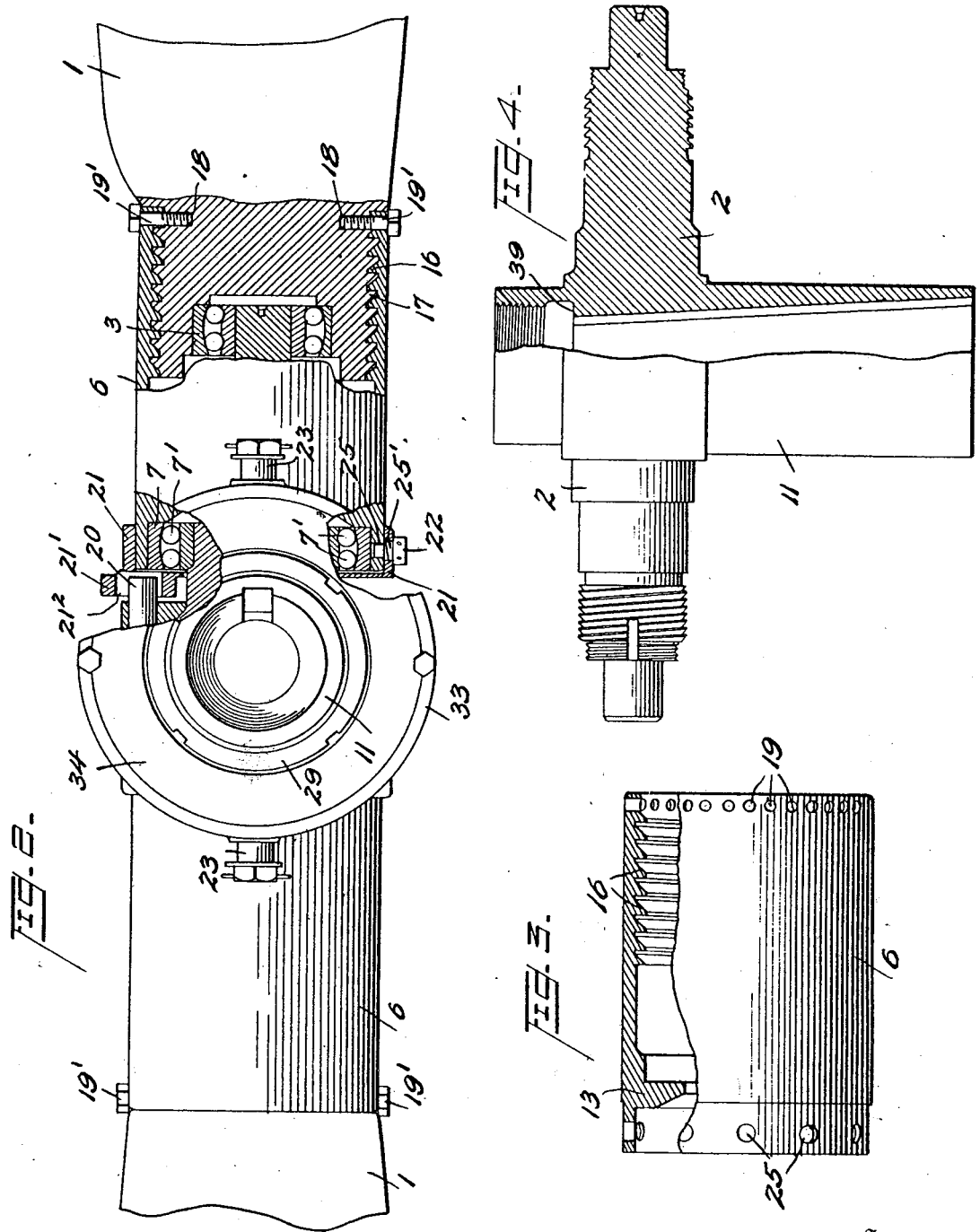

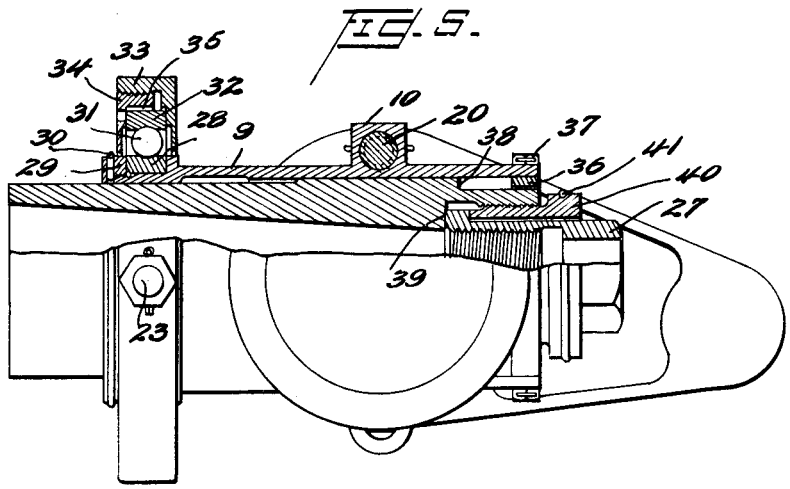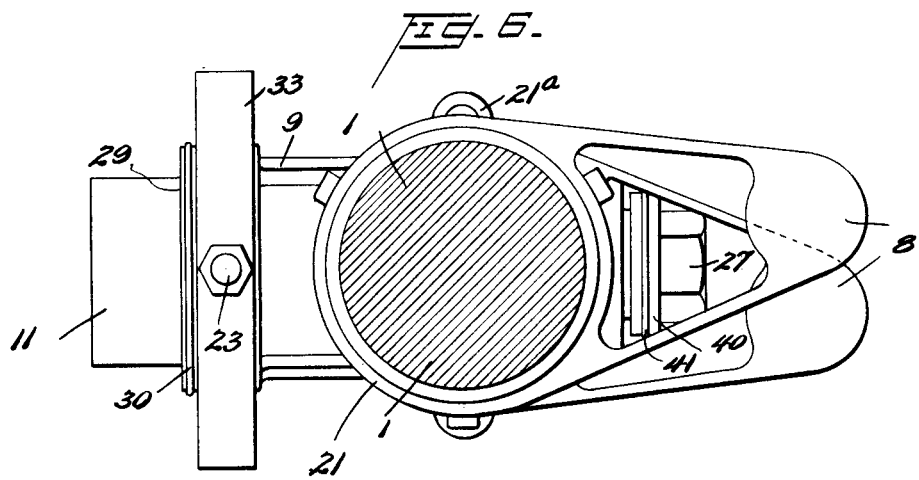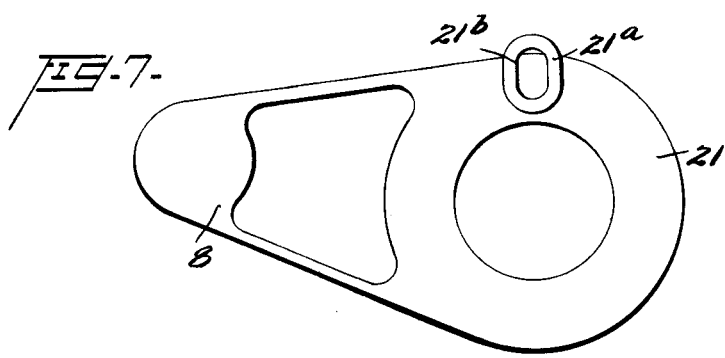

1,658,385

UNITED STATES PATENT OFFICE.

ERNEST G. McCAULEY AND FRANK W. CALDWELL, OF DAYTON OHIO; SAID CALD-WELL ASSIGNOR TO STANDARD STEEL PROPELLER COMPANY, A CORPORATION OF DELAWARE.

REVERSIBLE PROPELLER.

Application filed May 13, 1922. Serial No. 560,673.

This invention relates to propellers in general and more particularly to an improved means of construction thereof and suitable control mechanism for varying and adjusting the angularity of propeller blades, and changing the pitch of the propeller used in aircraft.

The object of this invention is to provide a propeller especially adapted for use in aircraft and capable of having the angularity of its blades varied as to pitch and reversed in their direction of force of propulsion, by means of suitable control mechanism operable at the will of the pilot.

Another object of this invention is to provide an improved means of mounting a propeller blade in a detachable ferrule and to provide means for adjusting the ferrule with relation to the propeller blades and also to the operating ring of the propeller reversing control mechanism.

The conventional type of propeller is designed to constitute a fixed pitch propeller and has its blade angles and widths determined to provide the greatest efficiency in its operation. In the present invention it is proposed to provide a reversible propeller which will have a greater range of travel for changing from a fixed pitch propeller to an increased pitch, than is possible in a fixed pitch propeller, and also capable of functioning properly when used with a supercharger, or the like, where the necessity is apparent to increase the pitch of the propeller in such proportions as to absorb the horse power of the engine at high altitudes where the torque of the engine remains practically the same as at sea level. This increase in pitch also retains the engine revolutions at a normal speed, thereby preventing the engine from racing when used in connection with a so-called constant torque engine. For this purpose the operating ring is made adjustable, while the travel of the yoke remains the same, by adjusting the operating ring on the ferrule, thus allowing the pitch of the blades to be further increased.

With the foregoing and other objects in view, which shall appear as the description proceeds, the invention resides in the combination of parts and in the details of construction hereinafter described, illustrated and claimed, the specific embodiment thereof being illustrated in the accompanying drawings, in which:

Figure 1 is a plan view of the propeller hub and blades attached, partly in section:

Figure 2 is a plan view partly in section of the sliding yoke and operating ring assembly:

Figure 3 is a cross section through the propeller hub ferrule:

Figure 4 is a section through the propeller hub showing one of its shaft spindles in section.

Figure 5 is an end view of the propeller showing the slide yoke and shifting ring devices and showing the hub in partial cross section.

Figure 6 is an end view of the invention showing the counterbalancing weights attached to each blade.

Figure 7 is a detail view of the counterbalancing weight attached to the operating ring.

Referring more particularly to the drawings, a propeller hub 11 having a tapered bore and mounted on the tapered end of an engine shaft, is provided with opposed integral arms or shaft spindles 2. A propeller blade 1 of any suitable material such as bakelite, or other material, has its inner end portion reduced and screw-threaded at 17 to receive the threads 16 of a ferrule 6. A tapped hole 18 is arranged in the propeller blade to register with corresponding holes 19 in the ferrule 6 for the purpose of allowing adjustment thereby and to receive cap screw 19′ to lock and insure against relative movement between the blade and the ferrule. By screwing the blade 1 into the ferrule 6 it is possible to interchange or replace propeller blades without destroying the ferrule. Another advantage gained by this construction resides in the possibility of thus adjusting the balance of the propeller as a unit, by screwing either blade in or out of the ferrule slightly, thus moving the weight of the whole blade to effect the desired balance, as all propellers must be perfectly balanced, before they may be used in aircraft. A blade aligning bearing member 3 is pressed into a counter-bored portion of the inner end of the blade in order to center the blade on the shaft spindle 2 on the end of which the said bearing is mounted. This is necessary as the ferrule 6 is not otherwise held in alignment with the shaft spindle. A ferrule aligning member 7 is mounted upon the inner end of the ferrule and forms a means of centering the inner end of the ferrule with the shaft spindle. It will therefore be seen that the radial bearing 7 assists the bearing 3 in maintaining perfect alignment of the axes of the blade, spindle, and ferrule.

A thrust collar 4 is screwed on a spindle 2 and is further held in place by means of a flanged plate 14 and lock nut 15 which is also screwed onto the shaft spindle 2. The thrust collar 4 is provided with a spherical seat 4' to receive the thrust bearing 5 and rollers 5', and is made adjustable by means of trapezoidal threads in order to obtain perfect alignment of the thrust collar 4 in relation to the shaft spindle 2 and also an equal pressure distribution on the thrust bearing 5.

The thrust bearing 5 is mounted against an inner flange 13 of the ferrule 6 on its one side and the spherical seat 4' of the thrust collar 4 on its other side, and is free to align itself on the ferrule flange 13 in relation to the thrust collar 4.

A ferrule aligning bearing 7 having balls 7' is mounted on the inner end of the ferrule 6 and intermediate the latter and the shaft spindle 2, for the purpose of maintaining alignment between the ferrule and the spindle.

In order to allow perfect alignment in relation to a given point on the blade after the blade is secured into the ferrule and locked by the cap screws 19', an operating ring 21 provided with a counterbalancing arm 8 is adjustably fitted around each ferrule by means of corresponding tapped holes 25' in the ring 21 and the drilled holes 25 in the ferrule 6 to be engaged by the screw dowels 22 safetied by suitable wires 24. In order to adjust the relationship between the ring 21 and the ferrule 6 it is only necessary to remove the screw dowels 22 and rotate the ring to the desired degree and again secure same in position by means of the dowels 22, the ring being provided with an odd number of equally spaced holes to correspond to an even number of equally-spaced holes in the inner end of the ferrule.

A lug 21ᵃ is made integral with the operating ring 21 and is provided with a slot 21ᵇ for receiving an operating pin 20. A sliding yoke 9 is provided for the purpose of effecting the operation of the operating ring 21 by having a lug 10 integral on opposite sides of the yoke for holding in position operating pins 20 made to engage the operating ring 21 in the slot 21ᵇ.

The sliding yoke 9 is also provided with a radial thrust bearing race 28 which is mounted thereon and held in place by a lock nut 29 and safetied by a lock wire 30. Antifriction balls, 31, between the bearing races 28 and 32, allows the sliding yoke to rotate with the propeller, while an outer shifting ring 33 and lock ring 34 engages the bearing race 32 which is non-rotating and being so held by a suitable propeller control mechanism. adapted to engage lug extensions 23 for the purpose of shifting the sliding yoke forward or backward along the shaft hub 11 to effect the changing of the pitch of the propeller.

Locking ring 34 is made with an enlarged diameter over the bearing race 32, leaving an opening 35 between the bearing race and the locking ring. This is to facilitate in the adjustment of the locking ring 34 and shifting ring 33 with the sliding yoke 9 and any suitable propeller control mechanism.

A stop ring 36 is secured by screws 37 to the outer end of the sliding yoke 9 in order to provide a limiting stop means against said hub at points 38, from increasing the pitch of the propeller blades beyond a determined position.

A hub retaining nut 27 is provided to screw on the end of the engine shaft against the shoulder 39 of the hub to wedge the hub onto the engine shaft and held in place by a lock nut 40 screwed into the extension 26 of the hub and safetied by means of the lock wire 41.

By reason of the fact that the operating ring is adjustable it is possible to obtain perfect angular alignment of the blade with relation to any given point on the propeller blade after the blade is secured into the ferrule and locked. This allows both propeller blades to be assembled in their respective ferrules and positioned in relation to tracking with each other.

Resulting from actual experience in the use of reversible propellers, it has been found that while rotating, the propeller blades have a tendency to change their angular positions or pitch and turn towards a neutral or so-called no-pitch position, either when revolving as an increased pitch or reversed pitch propeller. This is partly due to the centrifugal force acting upon the different individual masses of the propeller through their respective lever arms, resulting in a turning force on the blade about its longitudinal axis tending to align the blade with the plane of rotation. It is also partly due to the air resistance on the trailing side of the blade being slightly larger than the air resistance on the leading side of the blade in the usual construction. In the usual construction, the center of air pressure on the blade is to the rear of the longitudinal pivotal axis of the blade in normal flight. It is for this reason that a counterbalance 8 has been added to each propeller blade in order to neutralize or counterbalance the combined effect of the centrifugal forces and the aerodynamic forces acting on the propeller blades, and offset this unbalanced twisting condition, so that the blades will retain their respective angular position in whatever pitch they may be set while thus rotating. These counterbalances are to be so proportioned that they will have a slight tendency to increase the pitch of the propeller, thereby preventing any possibility of the blades returning to a neutral position, unless forced to do so by a manual force that might be applied to overcome the counterbalanced effect of the counterweights, when it is desired to fully reverse or further increase the pitch of the propeller.

Having thus described our invention, we claim:

1. In combination, in an adjustable pitch propeller, a hub, a plurality of spindles thereon, a plurality of ferrules mounted on said spindles, propeller blades fastened into said ferrules, and means for adjusting said blades with relation to said ferrules.

2. In combination with an adjustable pitch propeller, a hub, a plurality of spindles, a ferrule adjustably mounted on each of said spindles, a propeller blade threaded into each ferrule, a series of holes in said ferrule, and locking screw dowels cooperating with said holes to adjustably lock said blades and ferrules together.

3. In combination, in an adjustable pitch propeller, a plurality of propeller blades therefor, an outside ferrule attached to the inner end of each blade, a hub provided with a plurality of integral shaft spindles, a thrust bearing member mounted in each ferrule, and an adjustable thrust collar screw-threaded on each shaft spindle and provided with a spherical face to form a seat for said thrust bearing member.

4. In combination, in an adjustable pitch propeller, a hub, a plurality of spindles thereon, a ferrule for each spindle, a propeller blade having its inner end mounted on each of said spindles, means for attaching said ferrules to said spindles and a counterweight attached directly to each ferrule for counterbalancing the combined centrifugal and aerodynamic moment of said blades.

5. In an adjustable pitch propeller, in combination, a hub, a plurality of ferrules attached thereto, a propeller blade mounted in each of said ferrules and a counterweight adjustably attached directly to each ferrule exteriorly thereof to neutralize the combined aerodynamic and centrifugal moment of said blade.

6. In an adjustable pitch propeller, in combination, a hub, a plurality of spindles thereon, a ferrule mounted on each spindle, a propeller blade adjustably mounted in each ferrule, and a counterweight adjustably attached directly to each of said ferrules exteriorly thereof for neutralizing the combined centrifugal and aerodynamic moment of said propeller blade being capable of having its pitch manually adjusted by the operation of said counterweight while in flight.

7. In an adjustable pitch propeller, in combination, a hub, a plurality of spindles thereon, a ferrule mounted on each spindle, a propeller blade adjustably mounted in each ferrule, and a counterweight adjustably attached directly to each of said ferrules exteriorly thereof for neutralizing the combined centrifugal and aerodynamic moment of said blade, and annular means for operating said counterweight to manually adjust the pitch of the propeller blade attached thereto while in flight, a thrust collar threaded on each spindle, a thrust bearing cooperating therewith mounted in each ferrule, and a plurality of spaced aligning bearings centrally mounting each ferrule on its spindle.

8. In an adjustable pitch propeller, in combination, a plurality of blades therefor, manual means for adjusting the pitch of the blades, and a counterbalancing weight for each blade for neutralizing at all speeds of the propeller the turning effect on the blade due to the combined centrifugal and aerodynamic moments of the blades so as to permit easier manual adjustments of the blade pitch either in increasing or decreasing the pitch.

9. In an adjustable pitch propeller, in combination, a hub having a plurality of integral shaft spindles, a ferrule mounted on each spindle, a propeller blade mounted in each ferrule, a blade-aligning bearing between the end of each spindle and the end of the corresponding propeller blade, a thrust collar adjustably mounted on each spindle and provided with a spherical seat, an inturned flange on each ferrule for retaining said blades on said spindles, a thrust bearing mounted against said inturned flange within each ferrule and provided with a spherical seat to cooperate with the seat on the thrust collar, a radial aligning bearing member mounted on the inner end of each spindle to universally support the inner end of each ferrule on its corresponding spindle.

10. In an adjustable pitch propeller, in combination, a hub, and a plurality of propeller blades, a ferrule for each blade mounted upon the hub, an open-ended sliding yoke cylindrically bored the full length thereof to slide longitudinally on said hub, means for limiting the travel of said sliding yoke for the purpose of limiting the pitch of said propeller, said means comprising a cylindrical ring attached to said sliding yoke at its open end and being adapted to form a stop against said hub when the limited increased pitch has been reached, said propeller being capable of having its pitch adjusted by the operation of said sliding yoke.

11. In an adjustable pitch propeller, in combination, a hub provided with a plurality of integral spindles, a ferrule attached to each of said spindles, a propeller blade screwed into each ferrule, said blades being adapted to be screwed into or out of said ferrules by means of a threaded portion formed on the end of the blades and the outer inside portion of said ferrules, said ferrules being revoluble about the axes of said hub spindles until said blades are in adjustment in angular position relative to each other for the purpose of adjusting the balance of said propeller, said blades being adapted to be locked in relation to said spindles.

12. In combination, in an adjustable pitch propeller, a hub provided with integral shaft spindles, a cylindrical ferrule revolubly mounted on each of said spindles, a propeller blade having a cylindrical threaded end for engagement with each of said ferrules, adjustable compensating operating rings mounted on said ferrules and each provided with a slotted aperture for receiving operating pins, counterweights integral with said operating rings, a cylindrical sliding yoke rotating with and slidable longitudinally on said hub, said yoke having apertures to provide mountings for said operating pins, operating pins interconnecting said yoke with said operating rings, said propeller being adapted to have its pitch changed by the operation of said yoke.

13. The combination with an aircraft of a reversible propeller, said propeller having a hub provided with integral shaft spindles, cylindrical detachable ferrules revolubly mounted on said shaft spindles, self-aligning anti-friction bearings between said ferrules and said shaft spindles, interchangeable and adjustable blades mounted in said ferrules, self-aligning anti-friction bearings between said blades and said shaft spindle, adjustable compensating operating rings mounted on said ferrules, and provided with detachable operating pins, a cylindrical sliding yoke provided with a pitch-limiting device, a yoke-shifting ring for operating said yoke, and a radial thrust bearing between said sliding yoke and said yoke shifting ring.

14. A propeller comprising a hub having blade-receiving spindles thereon, propeller blades, ferrules having lengthwise adjustment directly on the outside of the inner ends of said blades, means to secure said ferrules rigidly in adjusted positions on said blades, said ferrules being rotatably adjustable about said blade-receiving spindles of said hub and means to adjustably secure said ferrules rigidly in adjusted positions on said blade-receiving spindles, whereby the balance of said propeller may be easily adjusted.

15. In an adjustable pitch propeller, in combination, a hub, a spindle therefor, a blade having a hollow root extension for the reception of said spindle, means for mounting said hollow root extension on said spindle, and a counter-weight attached to the exterior of said hollow root extension to neutralize the aerodynamic and centrifugal moment on said blade.

16. In an adjustable pitch propeller, in combination, a hub, a plurality of spindles on the hub, a blade for each spindle each having a hollow root extension for the reception of one of said spindles, means for mounting each hollow root extension on their spindles, and a counter-balancing weight attached to the exterior of each of said extensions for neutralizing the turning effect on the blade due to the combined centrifugal and aerodynamic moments of the blades.

In testimony whereof we affix our signatures.

ERNEST G. McCAULEY.
FRANK W. CALDWELL.